Oct. 4, 1927.

G. E. EDMUNDS 1,644,012

MINE CAR

Original Filed March 24, 1926

Inventor

Glenn E. Edmunds,

By Cushman Bryant & Darby

Attorneys

Patented Oct. 4, 1927.

1,644,012

UNITED STATES PATENT OFFICE.

GLENN E. EDMUNDS, OF COLUMBUS, OHIO, ASSIGNOR TO THE BONNEY-FLOYD COMPANY, OF COLUMBUS, OHIO, A CORPORATION OF OHIO.

MINE CAR.

Original application filed March 24, 1926, Serial No. 97,068. Divided and this application filed December 28, 1926. Serial No. 157,552.

The present invention relates to mine cars of the stub axle type and more particularly to a wheel mounting for this type of mine car.

An object of the invention is to provide an axle construction which is rugged and durable and which will provide automatic lubrication for the wheel for extended periods, thus avoiding the necessity for replenishing frequently the supply of lubricant.

A further object of the invention is to provide an axle construction and wheel mounting adapted to be readily set up or removed, and further when assembled will be securely held against displacement under the severe stresses which develop during use of the car.

The above and other objects of the invention will become clear as the description proceeds in connection with a preferred embodiment shown in the accompanying drawings wherein.

Figure 1:
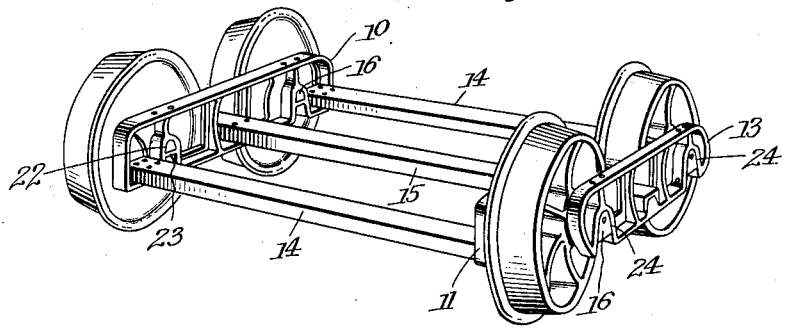
Figure 1 is a perspective of a truck formed to receive the improved mounting.
Figure 2:
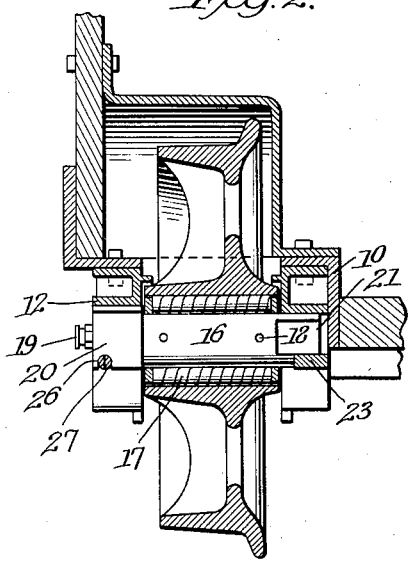
Figure 2 is a vertical sectional view showing one of the wheel mountings.
Figure 3:
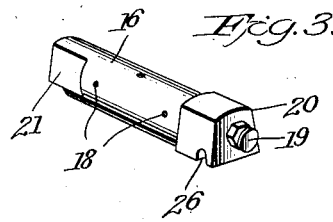
Figure 3 is a perspective of the axle.
Figure 4:
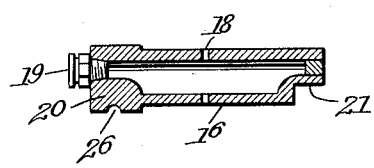
Figure 4 is a lognitudinal sectional view of the axle.

The present invention is a division of my co-pending application, Serial No. 97,068, filed March 24, 1926.

Referring first to the truck unit, the same comprises side sills or bars, arranged, preferably, in pairs, each pair having truck wheels disposed therebetween. In the drawings, 10, 11 indicate the inner members of each pair, and 12, 13, the outer members. These side sill bars are connected by channel beam cross-girts 14, the central one 15, of which, extends through the inner sill bars 10, 11, and is secured to the outer sill bars between the wheels. The latter are mounted independently upon stub axles 16 each having a central cylindrical portion upon which the roller bearings 17 may be arranged within the wheels. The axles are preferably hollow, being provided with lubricant exit apertures 18, and may be charged through suitable filling openings 19 at their outer enlarged ends 20.

The outer ends 20, and the reduced inner ends 21 are flattened or angularly formed to fit snugly within seats of substantially inverted U-shape. The seats 22 formed in the inner sill bars 10, are closed at their lower ends by means of cross-webs 23, and snugly receive the reduced axle ends 21, the latter being freely insertable into and withdrawable from the seats through the wheels, due to the fact that the ends 21 are reduced. The outer enlarged ends 20 of the axles fit snugly within seats 24, which are open at their lower ends. To prevent accidental downward movement of the axles, inward movement being prevented by the enlargement of the outer axle ends, the latter are formed with transverse grooves 26, through which extend releasable pins 27. When the pins are inserted into the casting, and extend through the grooves 26 across the outer axle seats, the axles are held against either downward or longitudinal movement. There is, however, no torsional strain upon the pins 27 since the axles fit snugly into their seats, and all torsional strain is taken up by the sill bars. When it is necessary to change a wheel, or axle, the cotter pin 27 is simply removed, and if the axle is drawn outwardly for a few inches to withdraw its inner end from the seat 22, the wheel and axle will drop from between the two sill bars. Moreover, it is possible to withdraw any axle without removing its wheel, since the reduced inner end of the axle may be drawn through the wheel hub and outer axle seat.

It will be understood, of course, that the invention is not to be limited to the details of construction illustrated and described, and such modifications of the preferred embodiment are within the scope of the invention as come within the meaning of the following claims.

I claim:

1. In a mine car, a truck of the independent stub axle type comprising a plurality of stub axles each having spaced substantially inverted U-end seats in said truck, one of said seats being open at its lower end and the other being closed, said axles having their ends fitting snugly into said seats and held against rotation.

2. In a mine car, a truck of the independent stub axle type comprising a plurality of stub axles each having spaced substantially inverted U-end seats in said truck, one of said seats being open at its lower end and the other being closed, said axles having their ends flattened and fitting snugly into said seats and held against rotation.

3. In a mine car, a truck of the independent stub axle type comprising a plurality of stub axles each having spaced inner and outer inverted U-end seats in said truck, the outer end seat being open at its lower end and the other being closed, said axles having their ends flattened and fitted snugly into said seats thereby being held against rotation.

4. In a mine car, a truck of the independent stub axle type comprising a plurality of stub axles each having spaced inner and outer inverted U-end seats in said truck, the outer end seat being open at its lower end and the other being closed, said axles having their ends flattened and fitted snugly into said seats thus being held against rotation, the inner ends of said axles being reduced whereby the same may be drawn through the wheels.

5. In a mine car, a truck of the independent stub axle type comprising a plurality of stub axles each having spaced inner and outer inverted U-end seats in said truck, the outer end seat being open at its lower end and the other being closed, said axles having their ends flattened and fitted snugly into said seats thereby being held against rotation, the outer end of each axle and said outer seats having fitting therein removable means serving to prevent outward longitudinal movement of the axle and dropping of the axle in said seat.

6. In a mine car, a truck of the independent stub axle type comprising a plurality of stub axles each having spaced inner and outer inverted U-end seats in said truck, the outer end seat being open at its lower end and the other being closed, said axles having their ends flattened and fitted snugly into said seats thereby being held against rotation, the outer end of each axle being transversely grooved adjacent its under surface, and releasable means extending into the outer seat and said groove preventing outward or downward movement of the axle.

7. In a mine car, a truck of the independent stub axle type comprising a plurality of stub axles each having spaced inner and outer inverted U-end seats in said truck, the outer end seat being open at its lower end and the other being closed, said axles having their ends flattened and fitted snugly into said seats thereby being held against rotation, the inner ends of said axles being reduced whereby the same may be drawn through the wheels, the outer end of each axle being transversely grooved adjacent its under surface, and releasable means extending into the outer seat and said groove preventing outward or downward movement of the axle.

In testimony whereof I have hereunto set my hand.

GLENN E. EDMUNDS.